Aug. 24, 1937.  M. J. ZUCROW  2,090,823
FUEL SYSTEM
Filed Feb. 25, 1933  3 Sheets-Sheet 2

INVENTOR.
MAURICE J. ZUCROW
BY
ATTORNEY

Aug. 24, 1937.   M. J. ZUCROW   2,090,823
FUEL SYSTEM
Filed Feb. 25, 1933   3 Sheets-Sheet 3
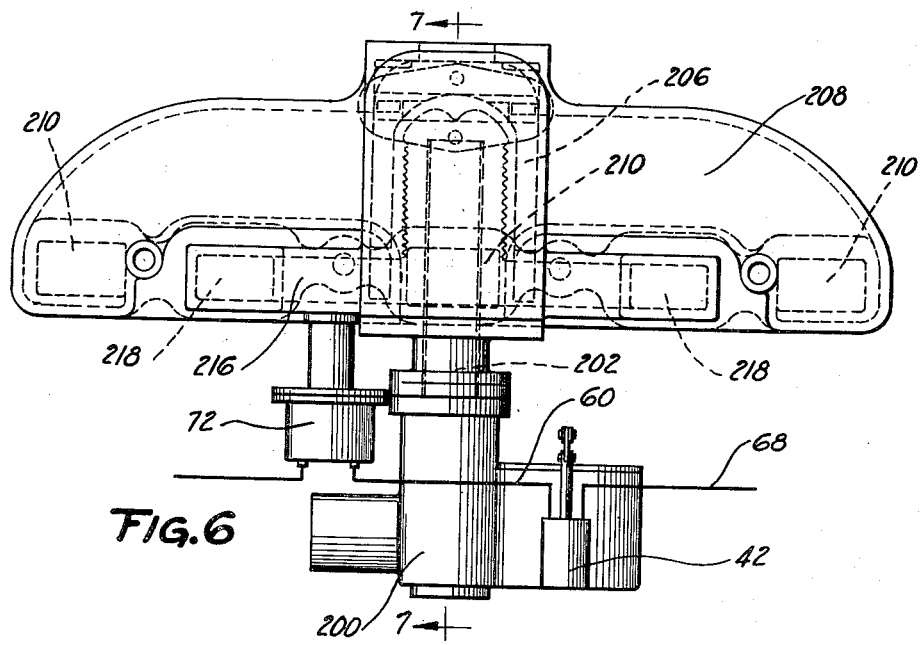
FIG.6
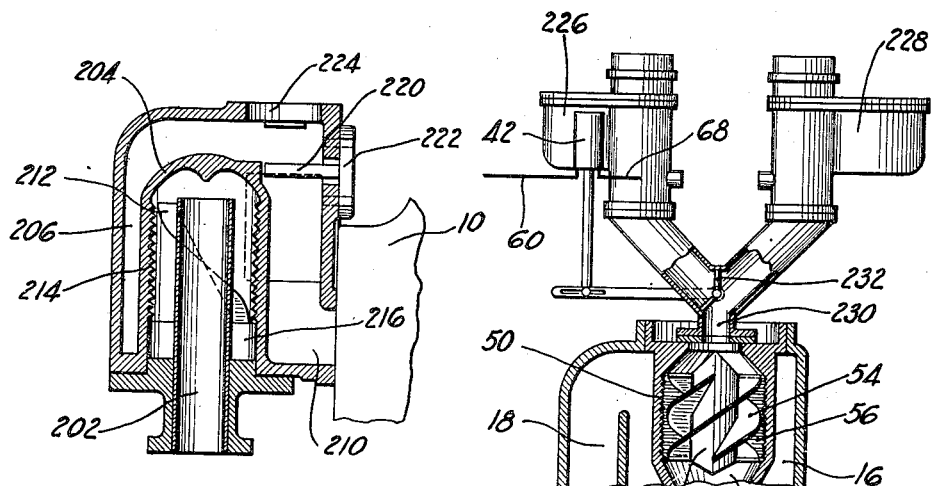
FIG.7
FIG.8
INVENTOR.
MAURICE J. ZUCROW
BY
ATTORNEY Patented Aug. 24, 1937

2,090,823

UNITED STATES PATENT OFFICE 2,090,823

FUEL SYSTEM

Maurice J. Zucrow, Chicago, Ill., assignor to Paragon Vaporizer Corporation, Chicago, Ill., a corporation of Illinois Application February 25, 1933, Serial No. 658,509

13 Claims. (Cl. 180—77)

This invention relates to systems for supplying fuels to automotive engines and the like, and is illustrated as embodied in a system for supplying to the engine a heated mixture of air with either a volatile fuel such as gasoline or a cheaper but less volatile fuel such as distillate.

An important feature of the invention relates to controlling the change from the heavy to the light fuel by a series arrangement of switches or other operating devices which are themselves respectively controlled according to various operating conditions of the vehicle or of the engine, so that all of such conditions must be favorable before the change to heavy fuel is made, and if any one of the conditions is not entirely favorable the engine will continue to run on gasoline. For example, the control devices so arranged in series with each other may include one governed by the vehicle speed, one controlled according to the temperature of the fuel-air mixture supplied to the engine, and if desired a third may be controlled according to the degree of opening of the engine throttle.

I consider it most convenient to control the change of fuel by an electric control circuit, the above-mentioned control devices being in the form of variously-controlled switches arranged in series in said circuit. The circuit may also include an actuating device for making the change, as for example a solenoid, or a solenoid-controlled power device, arranged to shift the feed from one bowl to the other of a two-bowl carbureter, or from one to the other of two carbureters. In some of the illustrated arrangements, the solenoid directly controls valves in the fuel-feed lines in the carbureter, or a valve controlling the fuel-air mixture passages, but in one embodiment shown in the drawings it controls a valve in the suction line of a vacuum-operated power device which actuates the fuel-selecting means.

Each of the various control devices in itself embodies features of novelty, which are however especially advantageous when they are all used together as described above. I consider it important that one device be actuated according to the road speed of the vehicle, so that the heavy fuel is only used ordinarily during the high road speeds of driving in the open country. By this arrangement, as soon as the bus or other vehicle enters a town, where it must slow down and stop for cross traffic and for traffic lights and the like the fuel is automatically changed to gasoline, giving quick getaway and greater flexibility generally, and in most cases insuring that when the vehicle stops at the end of the run, or for a long stop, the fuel in the intake passages etc. is gasoline and not the heavy fuel.

The devices illustrated for this purpose are of two types. Where the full advantage is desired, even at a slightly higher cost, I prefer to use a centrifugal switch driven preferably by the speedometer takeoff at the rear of the transmission. A cheaper installation having some of the above advantages may be made by utilizing a switch opened and closed by shifting the transmission into and out of high gear (direct drive).

The above-described apparatus is of especial utility in a system in which the mixture of air and fuel passes through a heating device, as for example a vaporizer having a novel exhaust-jacketed tortuous passage for the fuel-air mixture, and I consider it highly desirable that one of the above-described devices should control the fuel change according to the temperature of the fuel-air mixture as it leaves the vaporizer and enters the engine. Where an electric control circuit is used, this device may take the form of a thermostatic switch located between the vaporizer and the engine.

In order to insure against an accumulation of unvaporized heavy fuel when the engine is idling, as for example when free-wheeling, I prefer also to actuate one of the control devices in accordance with the throttle position, so that gasoline is always used when the throttle is closed or nearly closed.

Another feature of the invention relates to an improved fuel vaporizer suitable for use in the above-described system, which is unusually compact and which yet gives a thorough mixing of the fuel and air as they are being heated. In the illustrated form the fuel-air mixture passes through an open-ended tube which empties against a dome-shaped end of an exhaust-jacketed chamber which suddenly reverses the direction of flow of the mixture and conducts it to the intake manifold.

The above and other objects and features of the invention, including various novel combinations and subcombinations of parts, and desirable particular constructions, will be apparent from the following description of the illustrative embodiments shown in the accompanying drawings, in which:

Figure 6 is an elevation of a manifold assembly including a double carbureter of the updraft type instead of the downdraft carbureter of Figure 1, and including a novel compact form of vaporizer;

Figure 7 is a section through the novel updraft vaporizer, on the line 7—7 of Figure 6;

Figure 8 is a diagram corresponding to the upper part of Figure 1, and showing the use of two carbureters instead of one carbureter with two float bowls.

Figure 9 is a diagrammatic top plan view of a car embodying the invention as illustrated in Figure 1; and Figure 10 is a partial section on the line 10—10 of Figure 1, and showing the throttle of the carbureter.

Figure 1:
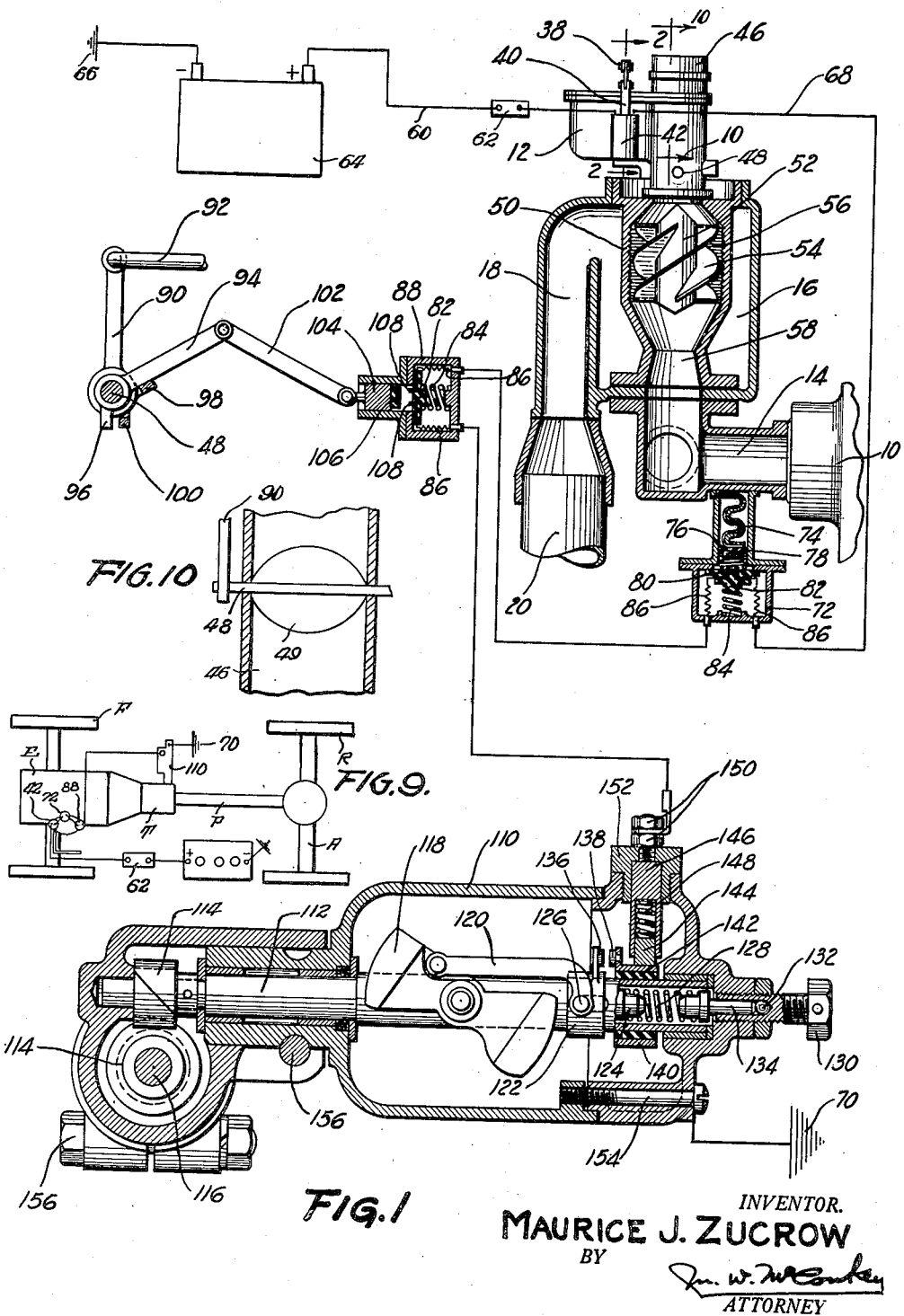
Figure 1 is a diagram showing the connection and arrangement of the parts of the system, with certain of the parts shown in section to illustrate their construction.

In the diagram of Figure 1, the engine is indicated at 10, being shown provided with a double-float-bowl carbureter 12 of the down-draft type communicating through a vaporizer (described below) with the intake manifold 14 of the engine. The engine exhaust manifold has a portion 16 jacketing the vaporizer and having an outlet 18 connected to the muffler conduit 20.

Figure 2:
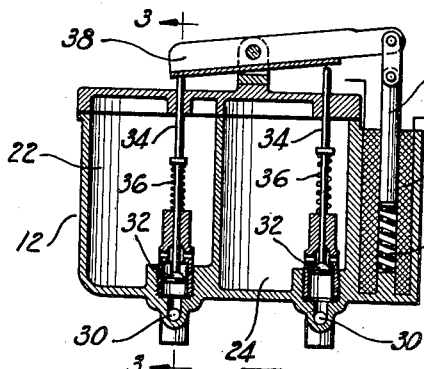
Figure 2 is a section, on the line 2—2 of Figure 1, through the carbureter, showing two float bowls for the two fuels.
Figure 3:
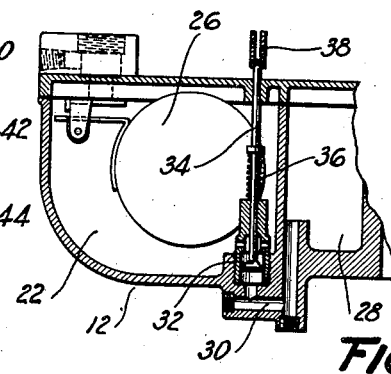
Figure 3 is a section, on the line 3—3 of Figure 2, through the carbureter, showing the float and valve mechanism for one side of the carbureter.

The carbureter, which in this embodiment serves as the source of both fuels, is shown in more detail in Figures 2 and 3. It includes two bowls 22 and 24 for the two fuels (ordinarily gasoline and distillate), each bowl being kept filled to a predetermined level by means of the usual float mechanism 26. Each bowl communicates with the fuel jet in the jet space 28 through a passage 30 controlled by a valve 32 having a stem 34 urged by a spring 36 upwardly to close the valve.

One or the other of the valve stems 34 is always depressed, to open its valve 32, by means such as a rocker arm or lever 38, pivoted between the two valves on the carbureter body, and shown with its end linked or otherwise connected to a plunger 40 forming the core of a solenoid 42 mounted on the side of the carbureter. When there is no current in the control circuit of this invention, the solenoid 42 is not energized and the core 40 is raised by its spring 44. When the solenoid is energized, the plunger 40 is drawn down against the resistance of its spring 44. In the first case, gasoline is fed through one passage 30 to the carbureter jet; in the other case the heavy fuel is fed through the other passage 30 to the jet.

The jet, economizer, acceleration pump, auxiliary idle jet, etc., of the carbureter, arranged in and adjacent the space 28, may be of any usual and well-known form, and are therefore not illustrated. Air is supplied to the carbureter through an intake or air horn 46, which may have the usual choke mechanism (not shown), and after taking up the fuel from the jet in the usual manner passes as a fuel-air mixture downwardly past the usual throttle valve into the upper end of the vaporizer described below, whence it passes into the intake manifold 14 and to the engine 10.

The throttle 49 of the carbureter is actuated by any usual mechanism (not shown) operated by a throttle shaft 48 or the like, rocked by the accelerator or by a hand lever on the steering column in the usual manner.

The vaporizer, through which the fuel-air mixture passes from the carbureter to the intake manifold, is shown as including a casing 50, set into the exhaust manifold 16, within which is coaxially arranged a guide or deflector 52 carrying one or a plurality of spiral vanes 54 extending substantially to the casing 50 and defining tortuous helical passages which throw the mixture centrifugally outward against the heated casing 50, which is shown as corrugated at 56 to increase its heat-transfer surface. The lower part of the vaporizer is formed as a venturi 58, which increases the velocity of the mixture passing through it, to assist in thoroughly vaporizing it.

The above-described vaporizer is more fully discussed, and is claimed, in my prior application No. 576,295, filed Nov. 20, 1931, now Patent No. 2,016,831, and it is not my intention to claim herein any subject-matter claimed in said prior application.

The present invention relates to controlling automatically the change from one fuel to the other, by means such as described above or a suitable equivalent, preferably by an electric control circuit connected to a lead 60 (which may go through the ignition switch 62 if desired) from the usual battery 64 which is shown grounded in the usual manner at 66 on the frame of the bus. The lead 60 is shown for convenience connected to one side of the control solenoid 42, with the various novel control switches arranged in series in a lead 68 from the other side of the solenoid to a ground 70 on the frame.

Beginning at the solenoid 42, in the arrangement illustrated the first control device in the circuit is a thermostatic switch 72 controlled by the temperature of the fuel-air mixture as it passes from the vaporizer 50 through the intake manifold 14 to the engine 10. This switch, in the form illustrated, includes a two-part casing in the upper part of which is a bimetallic strip thermostat element 74 immediately adjacent, and controlled as to its effective length by the temperature of, the intake manifold 14.

This element has mounted thereon at its lower end a carrier 76, on which is mounted a piece of copper 78 or the like adapted when sufficiently depressed to bridge two yielding metallic contacts 80.

The contacts 80 are carried by, and are shown embedded in, a plunger 82 of insulating material, arranged in the lower half of the casing and supported therein by a spring 84 so that further expansion of the thermostat 74 after the contacts 80 are closed will not affect the switch. Flexible leads 86 connect the contacts 80 with the circuit outside the switch. This switch insures that, regardless of other conditions, gasoline will be used until the engine temperature rises sufficiently to vaporize fully the heavier fuel.

The next control device in the illustrated series is a switch 88 controlled by the position of the engine throttle and, in the particular arrangement shown, actuated by the throttle shaft 48. Any usual throttle lever 90 may be fixed on the shaft and connected to the throttle valve itself 75 by a suitable connection 92. Loosely mounted on the shaft 48 is the hub of a switch lever 94, this hub also having a downwardly projecting lug 96. Lever 94 and lug 96 are engaged, with a provision for a certain amount of lost motion, respectively by lugs 98 and 100 formed on the hub of lever 90, or otherwise fixedly mounted on the shaft 48.

Switch lever 94 is connected, by means such as a rigid link 102, to a plunger 104 having at least its end portion formed of insulating material and carrying a contact piece 106 of copper or other conducting material adapted to bridge two yielding contacts 108 arranged and supported in the same manner as contacts 80. The switch 88 is fixedly mounted on any convenient support, usually on the engine.

The switch 88 insures that gasoline is used when the throttle is closed or nearly closed, and I prefer to arrange it so that the circuit is not closed until the throttle is about one-third open. Thus I insure the use of gasoline in ordinary driving in city traffic, where great flexibility is desired, and especially also when the engine is idling in going down hill, when free-wheeling by throwing out the clutch or by the use of a free-wheeling transmission, as in this latter case the vehicle speed is too high to throw out the centrifugal clutch described below. In fact, the switch 88 may be said in a general way to be controlled by engine speed as distinguished from vehicle speed.

The third control device shown in the circuit is a centrifugal switch 110 controlled according to the vehicle speed. This switch includes a suitable housing containing a driven shaft 112 connected by gears 114 to a short shaft 116 formed to be set in as a driving connection between the usual flexible speedometer drive and the speedometer-driving device at the rear of the vehicle transmission. The speedometer-driving device in the transmission, the flexible speedometer drive proper, and a power take-off connection such as the shaft 116 are all well known in the art and are therefore not illustrated or described in detail.

Shaft 112 has pivoted thereon a member 118 forming in effect a pair of balanced centrifugal weights. Member 118 is connected, as by links 120, to a sleeve 122 slidably arranged on the shaft and urged to the left in Figure 1 by a plunger 124 inside a hollow space formed in the shaft. Sleeve 122 may be connected to the plunger 124 by means such as a pin 126 passing through slots in the shaft.

Plunger 124 is acted on by a compressed coil spring 128, the tension of which may be adjusted by a threaded axial adjusting bolt or stop 130 formed with a central recess for a thrust ball 132 and the stem of a plunger 134 engaging the other end of the spring 128. Changing the tension of spring 128 by adjusting the stop 130 varies the vehicle speed at which the centrifugal weights 118 fly out and shift the sleeve 122 to the right.

Sleeve 122 is of course grounded, through the metallic parts described above and any suitable connection to the frame at 70, and carries a contact 136 adapted for engagement with a corresponding contact 138 carried by a metal sleeve 140 having an insulating bushing 142 by which it is mounted on the shaft 112. The metal sleeve 140 is in conducting engagement with a suitable conducting brush or sliding contact piece 144 formed as a plunger in a recess in a carrier 146 and urged toward sleeve 140 by a spring 148 also arranged in the recess. The carrier 146 has a threaded stem forming a binding post to which the circuit 68 is connected, and which is shown secured thereto by clamp nuts 150. The carrier 146 is mounted in a threaded plug 152 of insulating material seated in the casing of the switch.

The switch casing is shown made, for convenience, in three parts detachably fastened together by clamp screws and bolts 154 and 156.

The above-described centrifugal switch, being controlled by the speed of the vehicle, insures that gasoline will be used when driving in heavy city traffic and the like, where great flexibility is desired, and also that a bus will always come into its terminal on gasoline, so that there will be no possibility of condensation of the heavier fuel in the manifold when the engine is stopped.

Figure 9 is a diagram illustrating the arrangement of the above-described parts on a car. The engine E is shown driving the usual transmission T, which carries and drives the device 110, and the transmission drives the rear axle A through a propeller shaft P. The car has the usual dirigible front wheels F and rear wheels R driven by the axle A. The engine E supports the carbureter 46 and its associated parts.

Figure 4:
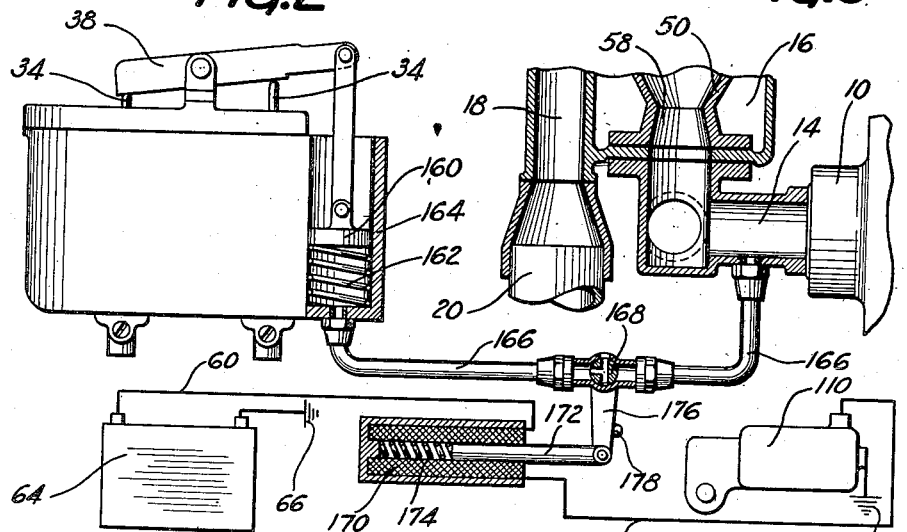
Figure 4 is a diagram corresponding to part of Figure 1, and showing a modified arrangement in which the fuel valves are actuated by a vacuum power device.

In the modified arrangement of Figure 4, instead of the fuel-changing lever 38 being directly operated by the solenoid, it is operated by a piston 160, acted on by engine suction against the resistance of a spring 162. The engine suction is obtained from the intake manifold 14, which is connected to the operating cylinder 164 below the piston 160 by a suitable conduit 166 containing a three-way control valve 168 adapted to connect the cylinder 14 alternatively to air or suction.

The vacuum-control valve 168 is actuated by means such as a solenoid 170 in the circuit 68, the plunger 172 of the solenoid acting against a spring 174 and being connected in any desired manner to a lever 176, or the like, operating the three-way vacuum valve 168. A suitable stop 178 may be provided, against which the spring 174 tends to hold the lever 176 to open cylinder 164 to air.

It will be seen that, at vehicle speeds high enough to operate the solenoid 170, the above-described device utilizes power from the intake manifold to shift from gasoline to the heavier fuel. The thermostatic valve may also, if desired, be included in the circuit of Figure 4.

Figure 5:
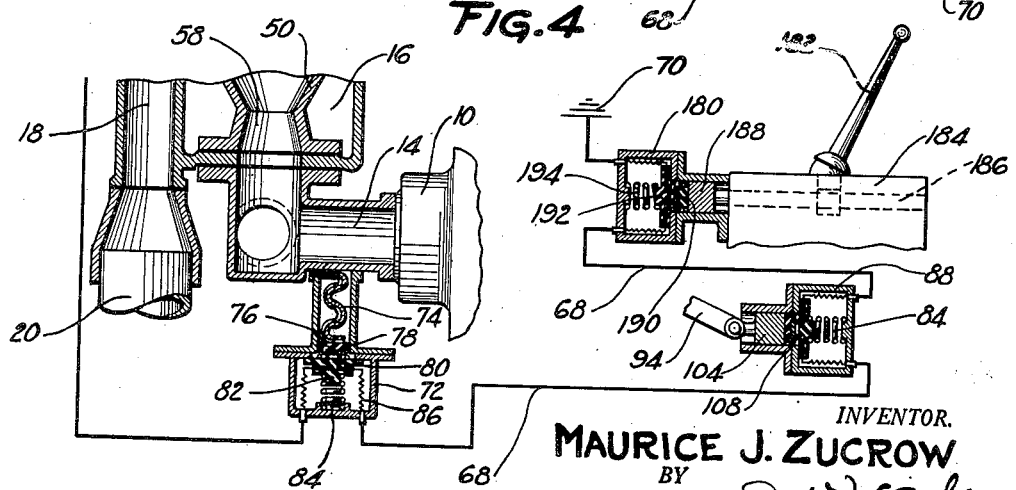
Figure 5 is a diagram corresponding to part of Figure 1, and showing another modified arrangement in which one of the switches is controlled by the position of the gear-shift lever.

The modified arrangement of Figure 5 is a cheaper arrangement having many of the advantages of the arrangement of Figure 1. In this case, the relatively expensive centrifugal rotary switch is replaced by a switch 180 closed by moving the gear-shift lever 182 of the transmission 184 into high-speed (direct drive) position.

In this arrangement, the high-second shifter rod 186 is arranged to operate a plunger 188 at least the forward end of which is of insulating material and which carries a contact plate 190 adapted to bridge contacts carried by an insulating plunger 192 held yieldingly by a spring 194. Thus in reverse, low, and second the engine is always running on gasoline, while in high speed position of the gearshift lever the engine may run on heavy fuel if the throttle is sufficiently opened and the temperature of the mixture in the intake manifold is high enough.

This arrangement is of especial utility in buses having transmissions with an extra (fourth) high speed or "over-drive" for running in the open country, as the arrangement is then such that heavy fuel is only used when the "over-drive" is being used.

In Figures 6 and 7, the solenoid 42 is shown operating a two-bowl updraft carbureter 200, of conventional design. The fuel-air mixture from this carbureter passes upwardly (instead of downwardly) through a tube or passage 202, and discharges from the upper end of this tube against the dome-shaped upper end of a vaporizer chamber or casing 204 surrounded by a jacket 206 forming part of the exhaust manifold 208. The particular manifold illustrated in the drawings is, except for the jacket construction, and changes necessitated thereby, of usual construction and is cast in the usual manner in one piece with the intake manifold described below, and is for a four-cylinder engine. The outlets from the engine into the exhaust manifold are indicated at 210.

The fuel-air mixture issuing from the upper end of the tube 202 is reversed suddenly, as to the direction of its flow, by the dome of the vaporizer casing 204, and flows downwardly in a spiral tortuous path defined by one or more spiral vanes 212 mounted on the outside of tube 202. The inner face of the casing 204 may be corrugated at 214 to increase the heat-transfer surface.

The heated mixture then passes to the engine through an intake manifold 216 having outlets 218 leading to the engine. As noted above, the intake manifold is ordinarily cast in one piece with the exhaust manifold. The thermostatic switch 72 is mounted at any desired point on the intake manifold, where it can measure the temperature of the heated mixture therein.

In a four-cylinder engine, ordinarily the center outlet 210 from the engine to the exhaust manifold comes directly opposite the vaporizer, and the gases therefrom become at times extremely hot and have no chance at all to cool before reaching the vaporizer.

I therefore prefer to mount opposite this particular outlet a deflector 220, having a head 222 bolted through slots to the outer face of the manifold, so that the deflector may be adjusted up or down to bypass more or less of the exhaust gases from this particular outlet directly to the muffler connection without passing around the jacket 206. To facilitate the adjustment of the deflector 220, a removable plug 224 may be provided directly above it.

In Figure 8 I illustrate how, instead of a two-bowl carburetor, I may use two standard downdraft or other carbureters 226 and 228, feeding respectively gasoline and the heavier fuel. In this case the two carbureters both open into a passage 230 leading to the vaporizer 50, the carbureter in use at any particular time being determined by a butterfly control valve 232 actuated by the above-described solenoid 42.

While several illustrative embodiments have been described in detail, it is not my intention to limit the scope of my invention to those particular embodiments, or otherwise than by the terms of the appended claims.

I claim:

1. A fuel system for the engine of an automotive vehicle or the like comprising sources of supply of two fuels for said engine, means for changing from one of said fuels to the other, and a plurality of control devices for said means arranged in series with each other and so arranged that one fuel is supplied when one control is actuated by a relatively high-speed and another control is actuated by a substantial opening of the engine throttle and a third control is actuated by a relatively high temperature of the fuel-air mixture for the engine, while the other fuel is supplied if any one of said controls is not so actuated, i. e. if the speed is too low or the throttle is too nearly closed or the mixture is too cold.

2. A fuel system for the engine of an automotive vehicle or the like comprising sources of supply of two fuels for said engine, means for changing from one of said fuels to the other, and a plurality of control devices for said means arranged in series with each other and one of which is controlled by the temperature of the engine and the other by the speed of the vehicle and which are so arranged that one fuel is supplied when one control is actuated by a relatively high speed and another control is actuated by a relatively high temperature of the fuel-air mixture for the engine, while the other fuel is supplied if either of said controls is not so actuated, i. e. if the speed is too low or the mixture is too cold.

3. A fuel system for the engine of an automotive vehicle or the like comprising sources of supply of two fuels for said engine, means for changing from one of said fuels to the other, and a plurality of control devices for said means arranged in series with each other and so arranged that one fuel is supplied when one control is actuated by a relatively high-speed and another control is actuated by a substantial opening of the engine throttle, while the other fuel is supplied if either of said controls is not so actuated, i. e. if the speed is too low or the throttle is too nearly closed.

4. A fuel system for the engine of an automotive vehicle or the like comprising sources of supply of two fuels for said engine, means for changing from one of said fuels to the other, and a plurality of control devices for said means arranged in series with each other and so arranged that one fuel is supplied when one control is actuated by a substantial opening of the engine throttle and another control is actuated by a relatively high temperature of the fuel-air mixture for the engine, while the other fuel is supplied if either of said controls is not so actuated, i. e. if the engine throttle is too nearly closed or the mixture is too cold.

5. A fuel system for the engine of an automotive vehicle or the like having a speedometer drive at the transmission, comprising sources of supply of two fuels, and means for changing from one fuel to the other including a speed-responsive device driven by the speedometer drive and controlling the fuel change according to the vehicle speed.

6. A fuel system for the engine of an automotive vehicle or the like having a speedometer drive at the transmission, comprising sources of supply of two fuels, and electric means for changing from one fuel to the other including a circuit having therein a speed-responsive switch actuated by the speedometer drive and controlling the fuel change according to the vehicle speed.

7. A fuel system for the engine of an automotive vehicle or the like having a throttle and a throttle-controlling member, and comprising sources of supply of two fuels, and electric means for changing from one fuel to the other including a circuit having therein a switch moved by said member to one position when the throttle is opened a predetermined amount by said member and to another position when the throttle is correspondingly closed, temperature responsive means, and a second switch in said circuit controlled by said temperature responsive means, said switches jointly controlling said electric means.

8. A fuel system for the engine of an automotive vehicle or the like comprising sources of supply of two fuels, means for mixing said fuels with air, means for heating the fuel-air mixture and delivering it to the engine, a speed-controlled centrifugal device for changing from one fuel to the other, a throttle-position-controlled device for changing from said one fuel to the other, and a mixture-temperature-controlled device for changing from said one fuel to the other, said devices having a series arrangement such that all three of them must be in fuel-changing position before the change is made.

9. A fuel system for the engine of an automotive vehicle or the like comprising sources of supply of two fuels, means for mixing said fuels with air, means for heating the fuel-air mixture and delivering it to the engine, a speed-controlled centrifugal device for changing from one fuel to the other, and a mixture-temperature-controlled device for changing from said one fuel to the other, said devices having a series arrangement such that both of them must be in fuel-changing position before the change is made.

10. A fuel system for the engine of an automotive vehicle or the like comprising sources of supply of two fuels, means for mixing said fuels with air, means for heating the fuel-air mixture and delivering it to the engine, and a plurality of separate devices controlling the change from one fuel to the other and which are respectively responsive to changes in different conditions of operation and which are arranged in series so that all of them must be in fuel-changing position before the change is made.

11. A fuel system for the engine of an automotive vehicle or the like comprising sources of supply of two fuels, means for mixing said fuels with air, means for heating the fuel-air mixture and delivering it to the engine, and means for changing from one fuel to the other including a control circuit having a plurality of switches controlling the change from one fuel to the other and which are respectively responsive to changes in different conditions of operation and which are arranged in series so that all of them must be in fuel-changing position before the change is made.

12. A fuel system for the engine of an automotive vehicle or the like having a transmission, comprising sources of supply of two fuels for the engine, and means for changing from one fuel to the other including a control circuit having therein a switch opened and closed by shifting the transmission into and out of its high speed position.

13. A fuel system for the engine of an automotive vehicle or the like having a transmission, comprising sources of supply of two fuels for the engine, and means operated by engine suction under the control of a transmission part for changing from one fuel to the other.

MAURICE J. ZUCROW.